US012762670B1

(12) United States Patent
Ren et al.

(10) Patent No.: US 12,762,670 B1
(45) Date of Patent: Oct. 13, 2026

(54) GENERATION OF LOW-HIGH QUALITY DATA PAIRS FOR TRAINING A DENOISING MODEL

(71) Applicant: Zoom Communications, Inc., San Jose, CA (US)

(72) Inventors: Pengdao Ren, Hangzhou (CN); Qing Wang, Hangzhou (CN); Feng Xiao, Hangzhou (CN); Xingguo Zhu, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 19/237,959

(22) Filed: Jun. 13, 2025

(51) Int. Cl.

| | |
|---|---|
| ***G06T 5/70*** | (2024.01) |
| ***G06N 20/00*** | (2019.01) |
| ***G06T 3/40*** | (2024.01) |
| ***G06T 3/60*** | (2024.01) |
| ***G06T 5/50*** | (2006.01) |
| ***G06V 10/60*** | (2022.01) |
| ***G06V 10/774*** | (2022.01) |

(52) U.S. Cl.
CPC ............... *G06T 5/70* (2024.01); *G06N 20/00* (2019.01); *G06T 3/40* (2013.01); *G06T 3/60* (2013.01); *G06T 5/50* (2013.01); *G06V 10/60* (2022.01); *G06V 10/774* (2022.01); *G06T 2207/20081* (2013.01); *G06T 2207/20182* (2013.01); *G06T 2207/20221* (2013.01)

(58) Field of Classification Search
CPC .... G06T 5/70; G06T 3/40; G06T 3/60; G06T 5/50; G06T 2207/20081; G06T 2207/20182; G06T 2207/20221; G06N 20/00; G06V 10/60; G06V 10/774
See application file for complete search history.

(56) References Cited

U.S. PATENT DOCUMENTS

| | | | | |
|---|---|---|---|---|
| 2023/0334626 | A1* | 10/2023 | Zhang | G06T 5/73 |
| 2024/0386529 | A1* | 11/2024 | Yang | G06N 3/045 |
| 2025/0272803 | A1* | 8/2025 | Chen | G06T 5/70 |

* cited by examiner

*Primary Examiner* — Kyu Chae
(74) *Attorney, Agent, or Firm* — Kilpatrick Townsend & Stockton LLP

(57) ABSTRACT

Systems and methods for generating low-high quality data pairs for training a denoising model are provided. A communication platform accesses a first set of video data with a first noise level above a first threshold value. The communication platform extracts a noise sequence from the first set of video data. The communication platform augments one or more noise frames of the noise sequence in one or more aspects to obtain one or more augmented noise frames. The communication platform applies the one or more augmented noise frames to a second set of video data with a second noise level below a second threshold value to generate a third set of video data. The communication platform generates a pair of training video data comprising the second set of video data and the third set of video data to train a machine learning model for denoising video data.

20 Claims, 10 Drawing Sheets

GENERATION OF LOW-HIGH QUALITY DATA PAIRS FOR TRAINING A DENOISING MODEL

FIELD

The present application generally relates to virtual conferencing and more specifically relates to generation of low-high quality data pairs for training a denoising model.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
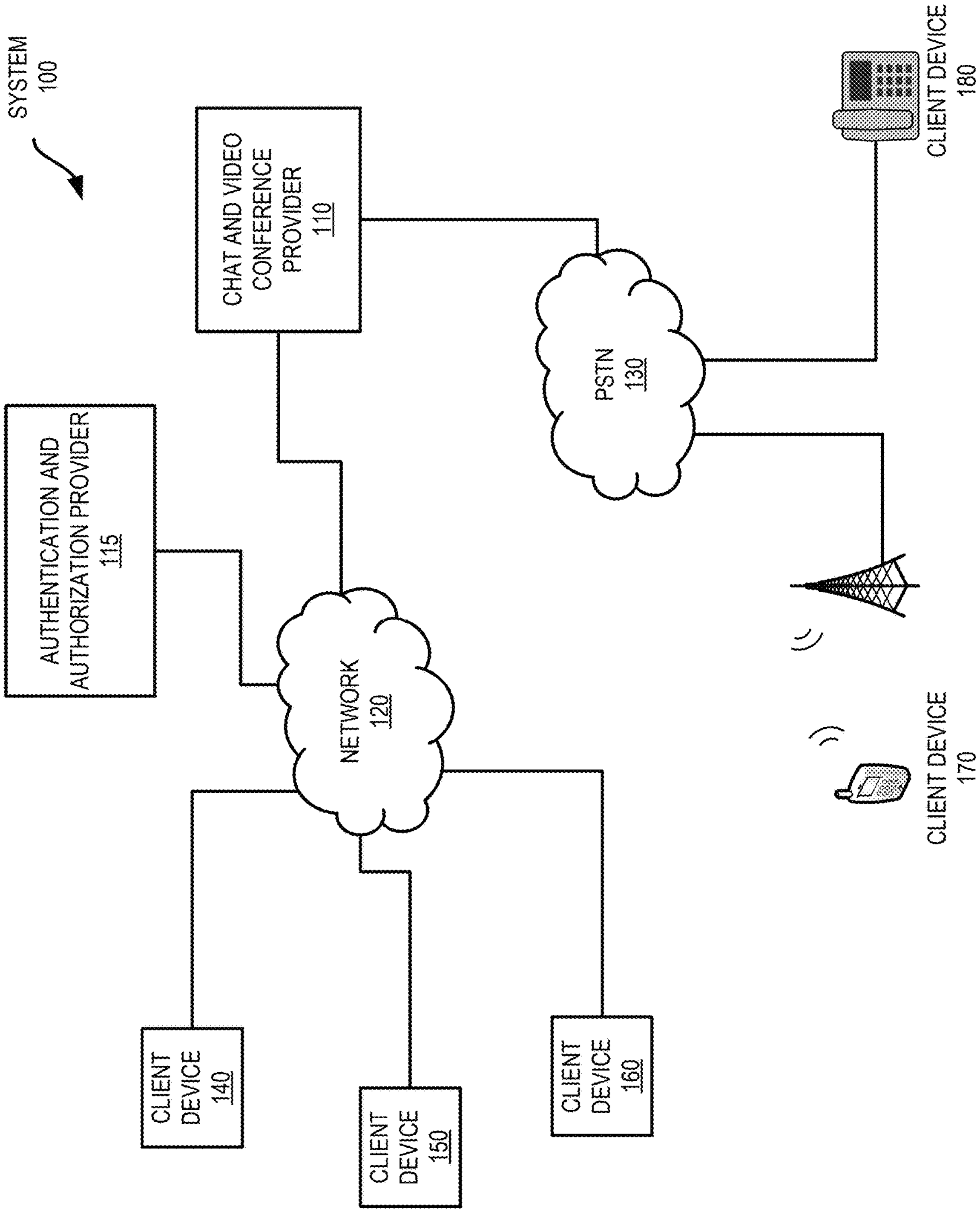
FIG. 1 shows an example system that provides chat and videoconferencing functionalities to various client devices.

Examples are described herein in the context of generation of low-high quality data pairs for training a denoising model. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing has become a common way for people to interact and exchange information. People can join a video conference to see and hear each other and converse largely as they would in person. However, the images captured by a user's camera may not be of high quality (e.g., having a lot of noise), which affects the visual experience of the video conference participant. The noise in images or videos captured by cameras is random variation of brightness or color information, appears as artifact in the images or videos. It may be caused by photon fluctuations, inconsistencies in photosensitive units of the cameras, data quantization, thermal noise, image signal processor (ISP) processing, etc. Noise not only affects the subjective quality of the video, but also increases the bit rate when the video is compressed or transmitted and has a negative impact on tasks such as syntax segmentation and object detection. To help denoise video, trained deep learning models may be used; however, obtaining suitable training data is of critical importance to properly training a deep learning model. For example, low-high quality data pairs may be used for supervised training of the deep learning models. A low-high quality data pair includes (1) a first video with low-quality video frames where the noise level is above a predetermined threshold and (2) a second video with high-quality video frames where the noise level is below the predetermined threshold.

There are two existing methods for generating low-high quality data pairs. One method is to directly add standard Gaussian noise to high quality data to generate low quality data, however, due to the significant difference between Gaussian noise and real noise, the network trained with such low-high quality data pairs cannot completely remove noise in real captured videos or images. The other method uses multi-frame averaging of noisy image/video data captured by high International Standards Organization (ISO) sensitivity cameras in low-light static scenes to obtain high quality data. Although this method captures paired data with real noise, multi-frame average cannot remove the camera's inherent spatial noise (e.g., fixed-pattern noise), resulting in the high-quality data with unremoved noise. Additionally, this method requires manual adjustment of camera exposure parameters during data collection. Most cameras, such as those in laptops and surveillance systems, do not support manual exposure settings, making them unsuitable for data collection. Moreover, the post-processing workload after data collection is substantial, further limiting the range of scenes and devices covered by the data, and the limited amount of data affects the model's performance, especially in transformer-based models. In summary, neither method can generate low-high quality paired data that meets the training requirements of real-scene denoising.

To facilitate training of a deep learning based denoising model, and further provide high-quality video data during video conferences, it is desirable to generate low-quality video data from real noise for training the denoising model. To do so, a communication platform includes a noise data acquisition engine, a noise data augmentation engine, and paired data generation engine. Different camera devices are fixed on a tripod to collect video data under various lighting conditions. The noise level of the collected video data is above a first predetermined threshold so that the collected video data can be called noisy video data. The noisy video data is used for extracting noise data. The noise data can be augmented in various aspects. The augmented noise data is added to captured high-quality video data to generate corresponding low-quality video data. The captured high-quality video data and the generated low-quality video data form a pair of training video data for training a denoising model.

In an example, once a set of noisy video data has been captured, the noise data acquisition engine denoises the set of noisy video data using one or more temporal and spatial denoising algorithms to obtain a set of clean video data whose noise level is below a second predetermined threshold. An image or video frame can include texture areas and flat areas. A texture area is a section of an image or video frame that has a visible pattern or variation in color and intensity. In a flat area, the color across the area is very similar, with minimal variations in hue and saturation, the neighboring pixel values are relatively consistent with minimal variations in brightness. If there are any slight variations, they are generally gradual and smooth, no abrupt changes in intensity. The texture area creates the perception of a surface with a specific texture like rough, smooth, bumpy, or woven, as apposed to a flat or uniform area. Although the noisy video data is collected under static conditions, some details in the textured areas may be lost after denoising. In addition, preserving texture increases the complexity of the denoising process. Thus, to avoid contaminating noise data with image details while also reducing the difficulty of denoising, the noise data acquisition engine selects the largest flat region (or area) in the clean video for noise data extraction. The noise data acquisition engine then calculates the frame difference between the set of noisy video data and the set of clean video data in the selected flat region to extract one or more noise frames, which can form a noise sequence.

The noise data augmentation engine augments the noise frames in different aspects, for example, geometry, pattern, global brightness, and local brightness. For example, the noise data augmentation engine randomly selects noise frames from the noise sequence and applies geometric transformations to the selected noise frames to obtain transformed noise frames. The geometric transformations include rotation, flipping, projection, etc. The noise data augmentation engine also randomly scales (or resize) the transformed noise frames in different resolutions to obtain resized noise frames. The noise data augmentation engine then mixes (combines) different resized noise frames in random proportions as a mixed noise frame to simulate different noise patterns. The noise data augmentation engine also augments the mixed noise frame under different global brightness levels and local brightness levels. After the augmentation process, the noise data augmentation engine provides an augmented noise frame that may include different parameters, which can be used to adjust noise pattern, global brightness, or local brightness, in order to produce random noise data.

The random noise data can be added to high-quality video data to produce low-quality video data. The paired data generation engine collects a set of high-quality video data, whose noise level is below the second predetermined threshold. The paired data generation engine then adds the random noise data to the set of high-quality video data to produce the low-quality video data. The low-quality data and the high-quality video data form a low-high quality data pair, which can be used to train an artificial intelligence (AI)-based denoising model.

Thus, the low-quality data is generated based on real noise and the amount of paired data is greatly increased through noise data augmentation. A denoising model trained using such data can effectively remove noise in real scenes. The paired data generation techniques in the present disclosure are not limited to be used for denoising, but can also be used in other fields of video and image restoration, such as dehazing, deraining, desnowing, removing compression artifacts, and deblurring.

This illustrative example is given to introduce the reader to the general subject matter discussed herein and the disclosure is not limited to this example. The following sections describe various additional non-limiting examples and examples of generation of low-high quality data pairs for training a denoising model.

Referring now to FIG. 1, FIG. 1 shows an example system 100 that provides chat and videoconferencing functionalities to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
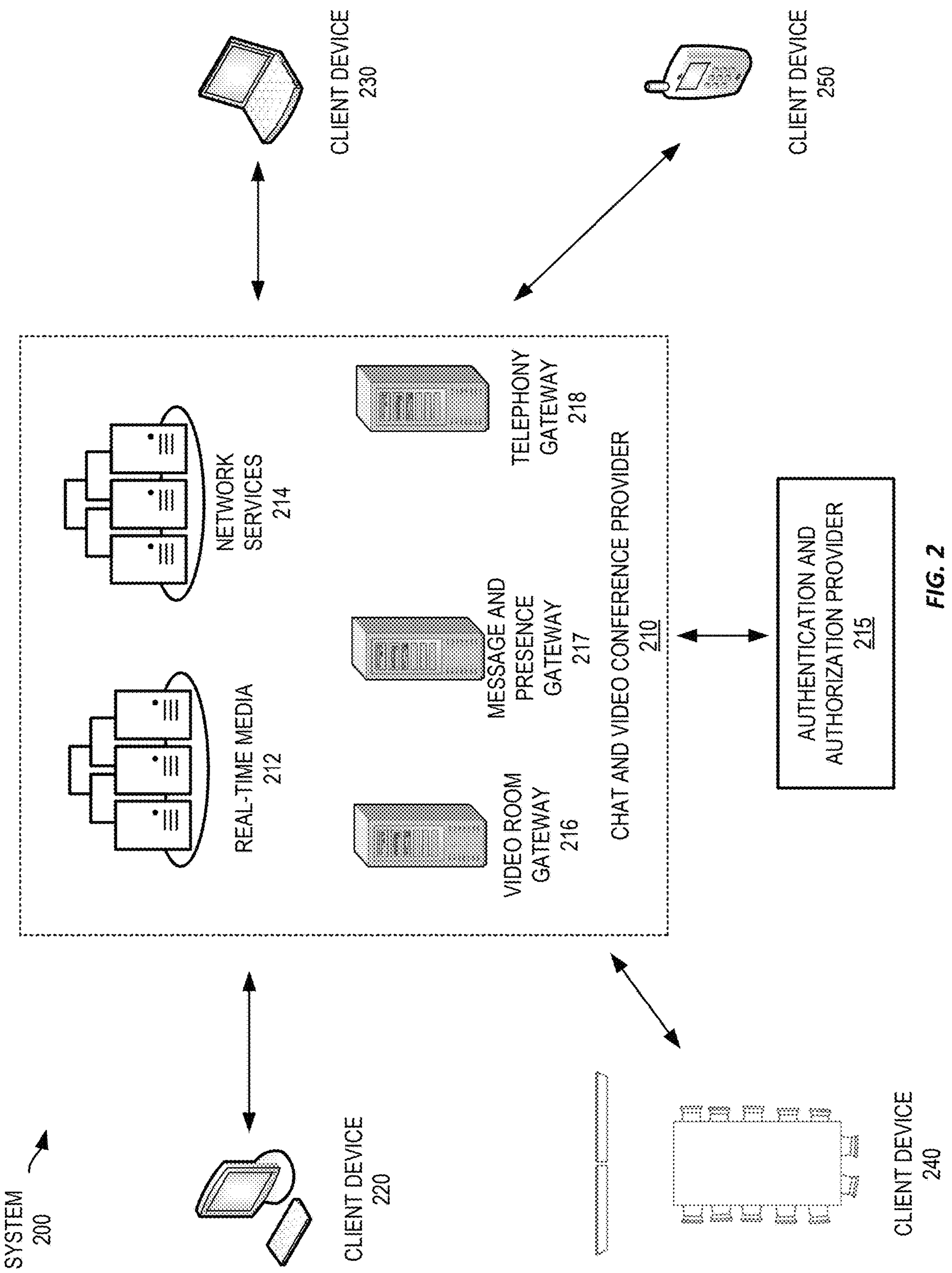
FIG. 2 shows an example system in which a chat and video conference provider provides chat and videoconferencing functionalities to various client devices.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides chat and videoconferencing functionalities to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
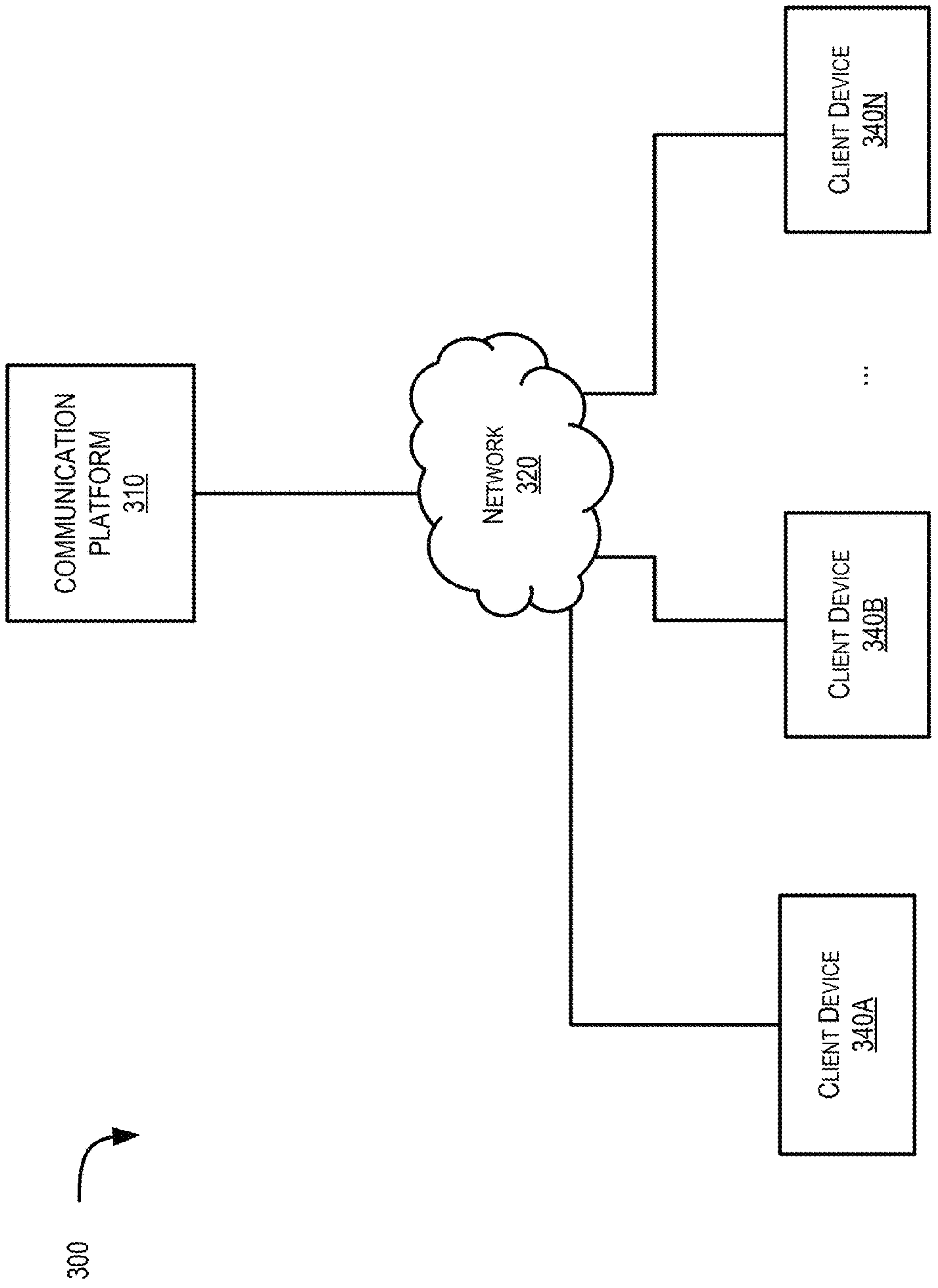
FIG. 3 shows an example system that can establish a virtual communication session.

Referring now to FIG. 3, FIG. 3 shows an example system 300 that can establish a virtual communication session. In this example system 300, a communication platform 310 and a number of client device 340A-340N (which may be referred to herein individually as a client device 340 or collectively as the client devices 340) are connected via a network 320. The communication platform 310 can be the chat and video conference provider 110 in FIG. 1 or the chat and video conference provider 210 in FIG. 2. The network 320 can be the internet or any suitable communications network or combination of communications network may be employed, including LANs (e.g., within a corporate private LAN), WANs, MANS, cellular network (e.g., 3G, 4G, 4G LTE, 5G, etc.), or any combination of these.

The client devices 340 can be any suitable computing or communications device. The client device 340 can be a client device (e.g., 140, 150, 160, or 170) in FIG. 1 or a client device (e.g., 220, 230, or 250) in FIG. 2. For example, client devices 340 may be desktop computers, laptop computers, tablets, smart phones having processors and computer-readable media, connected to the communication platform 310 using the internet or other suitable computer network. The client devices 340 have communication software installed to enable them to connect to the communication platform 310 for chats, video conferences, emails, and any other suitable communications. For example, during a video conference session, a user associated with a client device (e.g., client device 340A) can interact with other users associated with other client devices (e.g., client device 340B-340N) via the communication platform 310 by video and audio streams.

Figure 4:
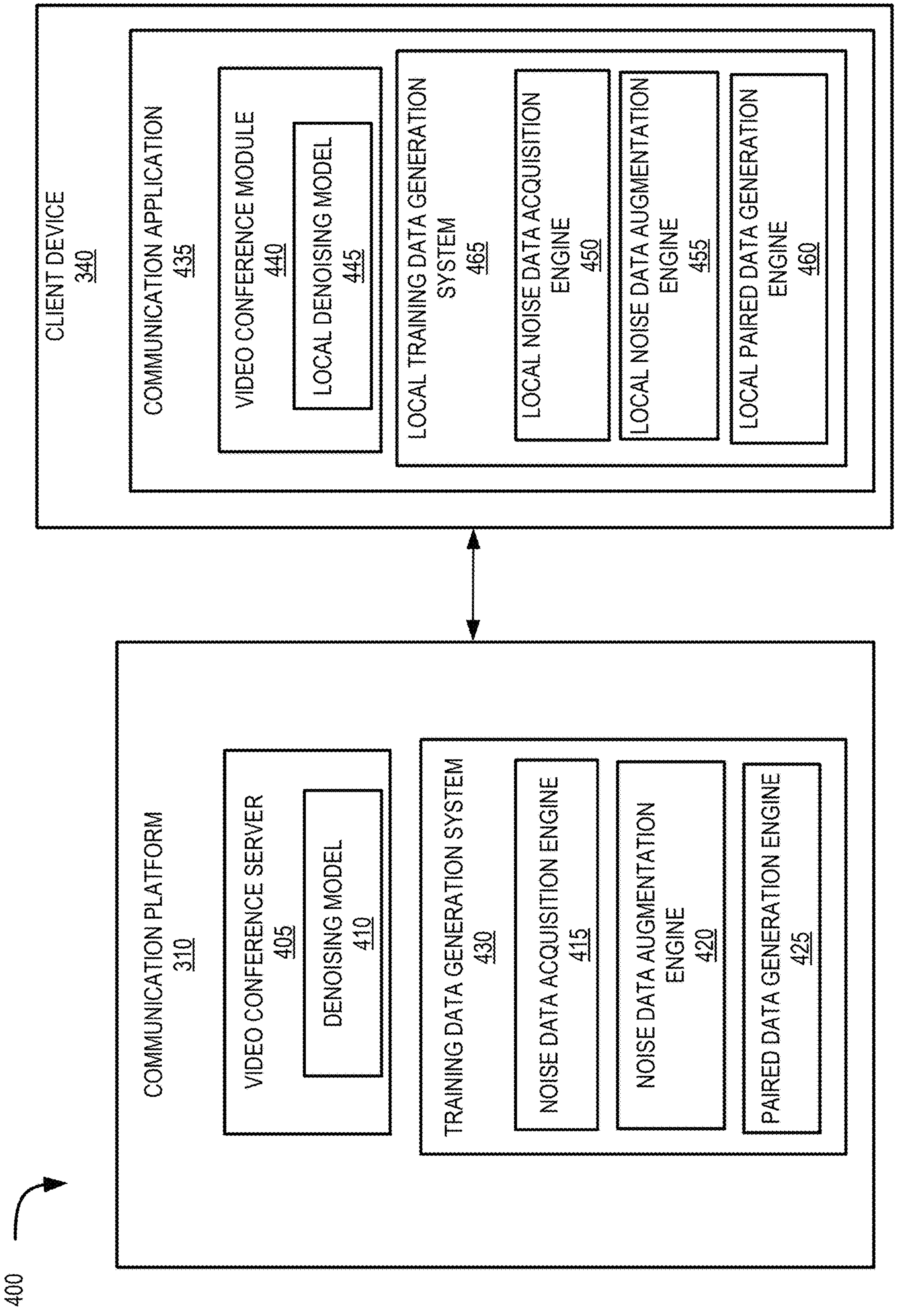
FIG. 4 shows an example system that is configured for generation of low-high quality data pairs for training a denoising model.

Now referring to FIG. 4, FIG. 4 shows an example system 400 that is configured for generation of low-high quality data pairs for training a denoising model. The communication platform 310 is in network communication with a client device 340 installed with a communication application 435. The communication platform 310 includes a video conference server 405 and a training data generation system 430. The video conference server 405 is configured to establish a video conference for a plurality of client devices 340. The video conference server 405 includes a denoising model 410 trained to denoise video streams during the video conference. The training data generation system 430 is configured to generate training data for training the denoising model 410. The denoising training data generation system 430 includes a noise data acquisition engine 415, a noise data augmentation engine 420, and a paired data generation engine 425.

The noise data acquisition engine 415 is configured to extract noise data from a set of noisy video data. Different camera devices are fixed on a tripod to collect noisy video clips under various lighting conditions. To avoid the influence of brightness variation on the noise level in different regions, the captured scenes in a noisy video clip are kept as uniform as possible. To provide suitable training data, the noise level in a video frame of the noisy video clip should be above a first predetermined threshold. The noise data acquisition engine 415 or another module in the training data generation system 430 can estimate the noise levels of an image or video frame using statistical methods, frequency domain analysis, model-based approaches. For example, a noise level is based on the variance of pixel values in a homogeneous region of an image. A higher variance indicates a higher noise level.

The noise data acquisition engine 415 then uses or implements an existing denoising algorithm to denoise a noisy video clip and obtain a clean video clip whose noise level is below a second predetermined threshold value. The second predetermined threshold value is less than the first predetermined threshold value. The existing denoising algorithm can be selected from one or more temporal and spatial denoising algorithms, for example multi-frame averaging, Kalman filter, video block-matching and 4D filtering (VBM4D), BasicVSR++, MambaIR, etc. Although the noisy video clip is collected under static conditions, some details in texture areas within the captured video may be lost after denoising. In addition, preserving texture increases the complexity of the denoising process.

To avoid contaminating the noise data with image details, such as texture information, while also reducing the difficulty of denoising, the noise data acquisition engine 415 selects an area where the color across the area is very similar with minimal variations in hue and saturation and the neighboring pixel values are relatively consistent with minimal variations in brightness. This may indicate a relatively uniform are of the image with little or no texture. Such an area is called a flat region or area. The noise data acquisition engine 415 identifies a flat area in a video frame based on histogram analysis, image filtering, or gradient analysis of the video frames of the noisy video clip. The noise data acquisition engine 415 selects the largest flat area in a clean video frame of the clean video clip for noise extraction. The noise data acquisition engine 415 then calculates the difference between a noisy video frame and a corresponding clean video frame in the selected flat area to extract a noise frame.

For example, the noise data acquisition engine 415 aligns the clean video frame with the noisy video frame and subtracts pixels values of the clean video frame from the corresponding pixel values of the noisy video frame at each pixel location of the selected flat area. If the difference is above a predetermined threshold, it represents noise at the pixel location. The noise data acquisition engine obtains a difference image of the selected flat area, which is the noise frame. The noise data acquisition engine 415 can obtain a noise sequence including multiple noise frames by comparing the noisy video clip and the clean video clip in the selected largest flat area.

After the noise sequence is created, it provided to the noise data augmentation engine 420. The noise data augmentation engine 420 is configured to augment the noise data in different aspects. For example, the noise data augmentation engine 420 is configured to augment the noise data with different geometries. The noise data augmentation engine 420 randomly selects noise frames from one or more noise sequences generated by the noise data acquisition engine 415, applies geometric transformations to the selected noise frames to obtain transformed noise frames. Example geometric transformations include rotation, flipping, projection, and other suitable transformations.

Alternatively, or additionally, noise data augmentation engine 420 is configured to augment the noise data with different noise patterns. Since the noise frames are extracted under a certain resolution, the noise data augmentation engine 420 randomly scales (or resizes) a transformed noise frame to different resolutions. The noise data augmentation engine 420 then mixes multiple scaled noise frames as one noise frame in random proportions to simulate different noise patterns of different cameras.

Still alternatively, or additionally, the noise data augmentation engine 420 is configured to augment the noise data with different global brightness. The noise frames extracted from a set of noisy video data are usually at a certain brightness. The noise data augmentation engine 420 can augment or enhance a noise frame with a random number to simulate noise changes under different global brightness levels. For example, the average brightness of the noise frame is L, and the maximum global brightness is 255, and the random number can be a uniformly distributed value between 0 and 255/L, representing a random brightness level.

Still alternatively, or additionally, the noise data augmentation engine 420 is configured to augment the noise data with local brightness. Noise level changes with respect to pixel intensity within a video frame or image. This relationship can be defined by a noise level function, which may be the standard deviation of noise with respect to image pixel density.

The noise data augmentation engine 420 accesses a high-quality video frame from a set of high-quality video data. The set of high-quality video data has a noise level below the second predetermined threshold value and is later to be used to generate a set of low-quality video data with a noise level above the first predetermined threshold value. The noise data augmentation engine converts the high-quality video frame into a grayscale image. The noise data augmentation engine 420 also estimates the noise level function for the high-quality video frame using wavelet decomposition or statistical analysis, and normalizes the noise level function to obtain a relative relationship of noise levels at different local brightnesses. The noise data augmentation engine 420 uses the normalized noise level function and the grayscale image to obtain a noise gain map. The noise data augmentation engine 420 augments a noise frame, for example the noise frame with adjusted global brightness as described above, by applying the noise gain map to the noise frame.

The paired data generation engine 425 is configured to generate low-high quality data pairs which can be used for training a denoising model. The paired data generation engine 425 collects the required high-quality video data. In some examples, the noise data augmentation engine 420 provides an augmented noise frame to the paired data generation engine 425. The paired data generation engine 425 adds the augmented noise frame to each video frame of the set of high-quality video data to form a set of low-quality video data so as to form a pair of low-high quality video data. In some examples, the noise data augmentation engine 420 provides an augmented noise sequence by repeating the augmentation process as described above multiple times to generated multiple augmented noise frames. The paired data generation engine 425 adds the augmented noise sequence to the set of high-quality video data to obtain a set of low-quality video data. The augmented noise sequence may be shorter (e.g., having less frames) than the set of high-quality video data. Then, the paired data generation engine 425 adds the augmented noise sequence to a subset of the set of high-quality video data iteratively until the entire set of high-quality video data is processed, thereby generating a set of low-quality video data. Thus, the paired data generation engine 425 generates a set of low-high quality data pairs, including the set of high-quality video data and the set of low-quality video data.

The denoising training data generation system 430 can provide the set of low-high quality data pairs to a trainer engine (not shown) to train a denoising model. Alternatively, the denoising training data generation system 430 is part of the trainer engine. In some examples, the generation of low-high quality data pairs and the training happen simultaneously. That is, as a low-high quality data pair is generated, it is provided to train the denoising model.

The communication application 435 installed on the client device 340 can include a video conference module 440 and a local training data generation system 465. The local training data generation system 465 includes a local noise data acquisition engine 450, a local noise data augmentation engine 455, and a local paired data generation engine 460. The local noise data acquisition engine 450 is configured to extract noise data from a set of noisy video data, similar to those in the noise data acquisition engine 415 on the communication platform 310 as described above. The local noise data augmentation engine 455 is configured to augment the noise data in different aspects, similar to the noise data augmentation engine 420 on the communication platform 310 as described above. The paired data generation engine 425 is configured to generate a set of low-high quality data pairs, similar to the paired data generation engine 425 on the communication platform as described above.

Figure 5:
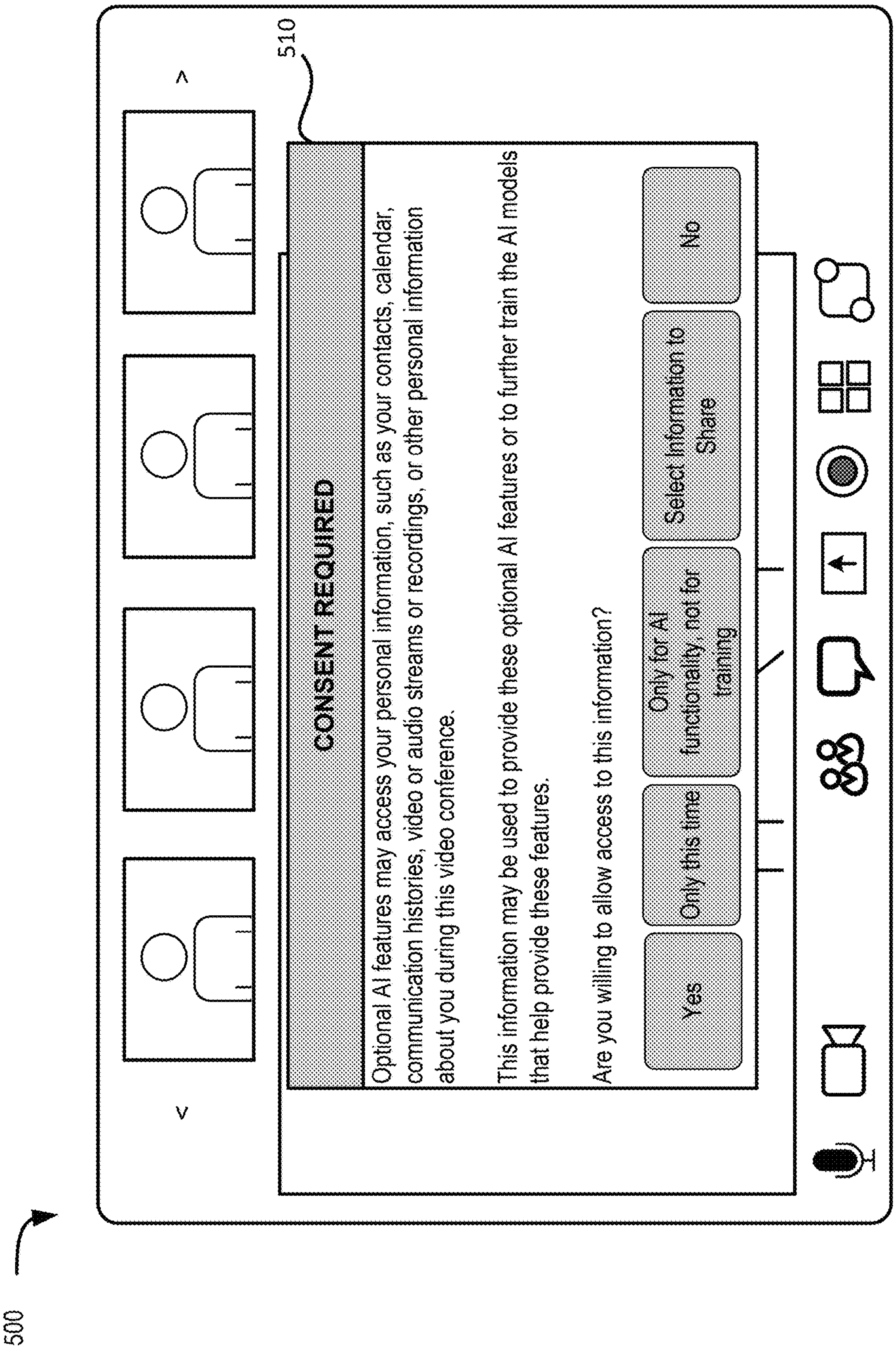
FIG. 5 shows an example GUI displaying a consent authorization request for accessing personal data.

Referring now to FIG. 5, FIG. 5 shows an example GUI 500 displaying a consent authorization request for accessing personal data. In some examples according to the present disclosure, a user may select an option to use one or more optional AI features available from a communication platform, such as the chat and video conference provider 110, the chat and video conference provider 210, or the communication platform 310. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to provide training data for the underlying AI models, the user may be provided with an option to consent, or deny consent, to access and use some or all of the user's personal information. In general, Applicant's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 5, a user has engaged in a video conference and has selected an option to use an available optional AI feature. In response, the GUI has displayed a consent authorization window 510 for the user to interact with. The consent authorization window informs the user that their request may involve the optional AI feature accessing multiple different types of information, which may be personal to the user. The user can then decide whether to grant permission or not to the optional AI feature generally, or only in a limited capacity. For example, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Figure 6:
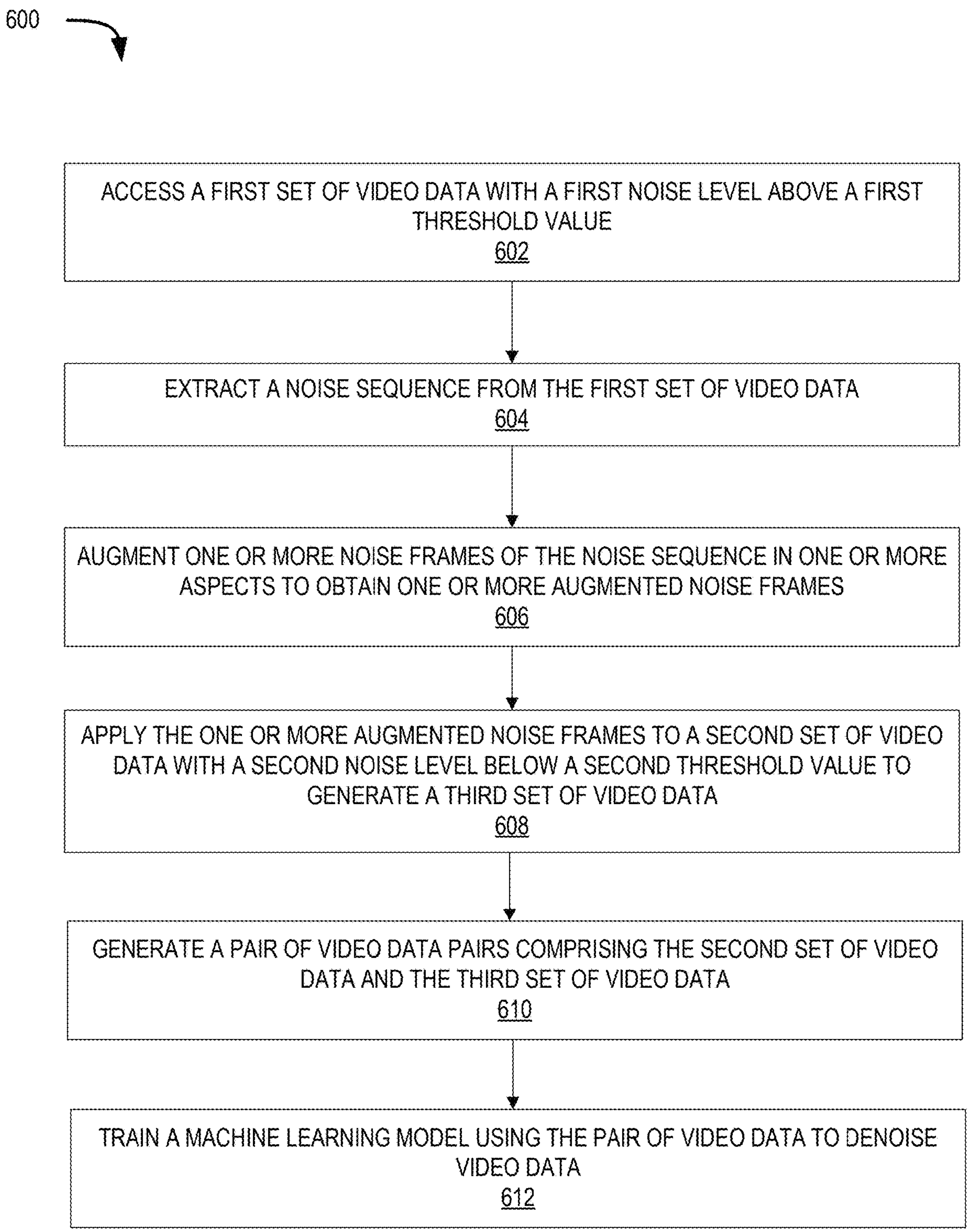
FIG. 6 shows an example method for generating low-high quality data pairs for training a denoising model.

Referring now to FIG. 6, FIG. 6 shows an example method 600 for generating low-high quality data pairs for training a denoising model. The example method 600 will be discussed with respect to the system 400 shown in FIG. 4; however, any suitable system for generating low-high quality data pairs for training a denoising model may be used.

At block 602, a communication platform 310 accesses a first set of video data with a first noise level above a first threshold value. The first set of video data with the first noise level above the first threshold value is a set of noisy video data. One or more camera devices are used to capture the set of noisy video data under various lighting conditions. The set of noisy video data can include multiple video clips from the one or more camera devices. Each video clip includes one or more video frames captured by a camera device under various lighting conditions. Noise in the set of noisy video data can be caused by any number of noise sources, such as low lighting conditions, the quality of the camera devices, or image processing. Each video frame is an image of a scene. In some examples, the set of noisy video data depict the same scene to avoid the influence of local brightness variation on the noise level in different regions of the set of noisy video data.

Figure 7:
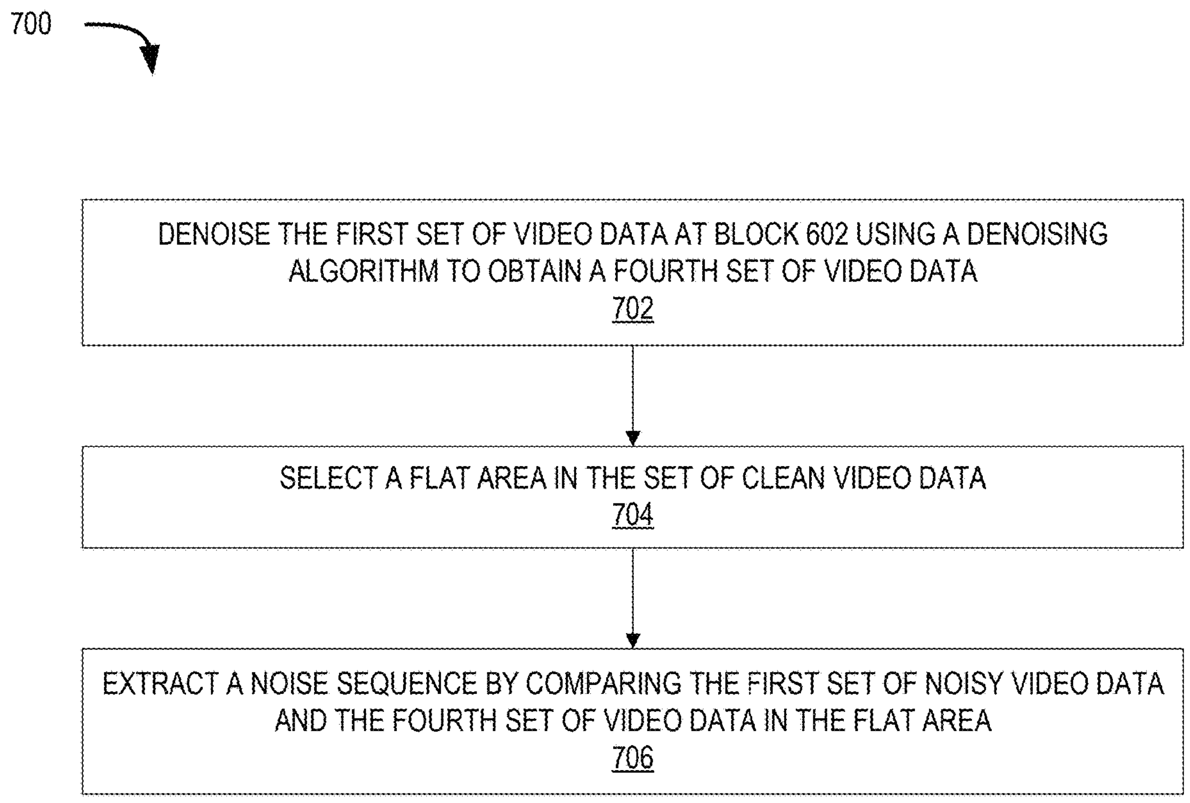
FIG. 7 shows an example method for extracting noise data from a set of noisy video data.

At block 604, the communication platform 310 extracts a noise sequence from the first set of video data. The noise data acquisition engine 415 of the training data generation system 430 on the communication platform 310 extracts a noise sequence from the first set of video data obtained at block 602. In some examples, the noise data acquisition engine 415 uses or implements a denoising algorithm to denoise the set of noisy video data and obtain a set of clean video data. The difference between each frame of the set of noisy video data and corresponding frame of the set of clean video data is a noise frame. The noise data acquisition engine 415 extract multiple noise frames by calculating the difference between the set of noisy video data and the set of clean video data frame by frame. FIG. 7 shows an example method for extracting noise data from a set of noisy video data, as will be described in detail below.

At block 606, the communication platform 310 augments one or more noise frames of the noise sequence in one or more aspects to obtain one or more augmented noise frames. The noise data augmentation engine 420 of the training data generation system 430 on the communication platform 310 augments one or more noise frames of the noise sequence, obtained at block 606, in one or more aspects. In some examples, the one or more noise frames are randomly selected from multiple noise sequences obtained by repeating block 604. Example aspects for augmentation include noise geometry, noise pattern, global brightness, and local brightness, as described above with respect to FIG. 4.

Figure 8:
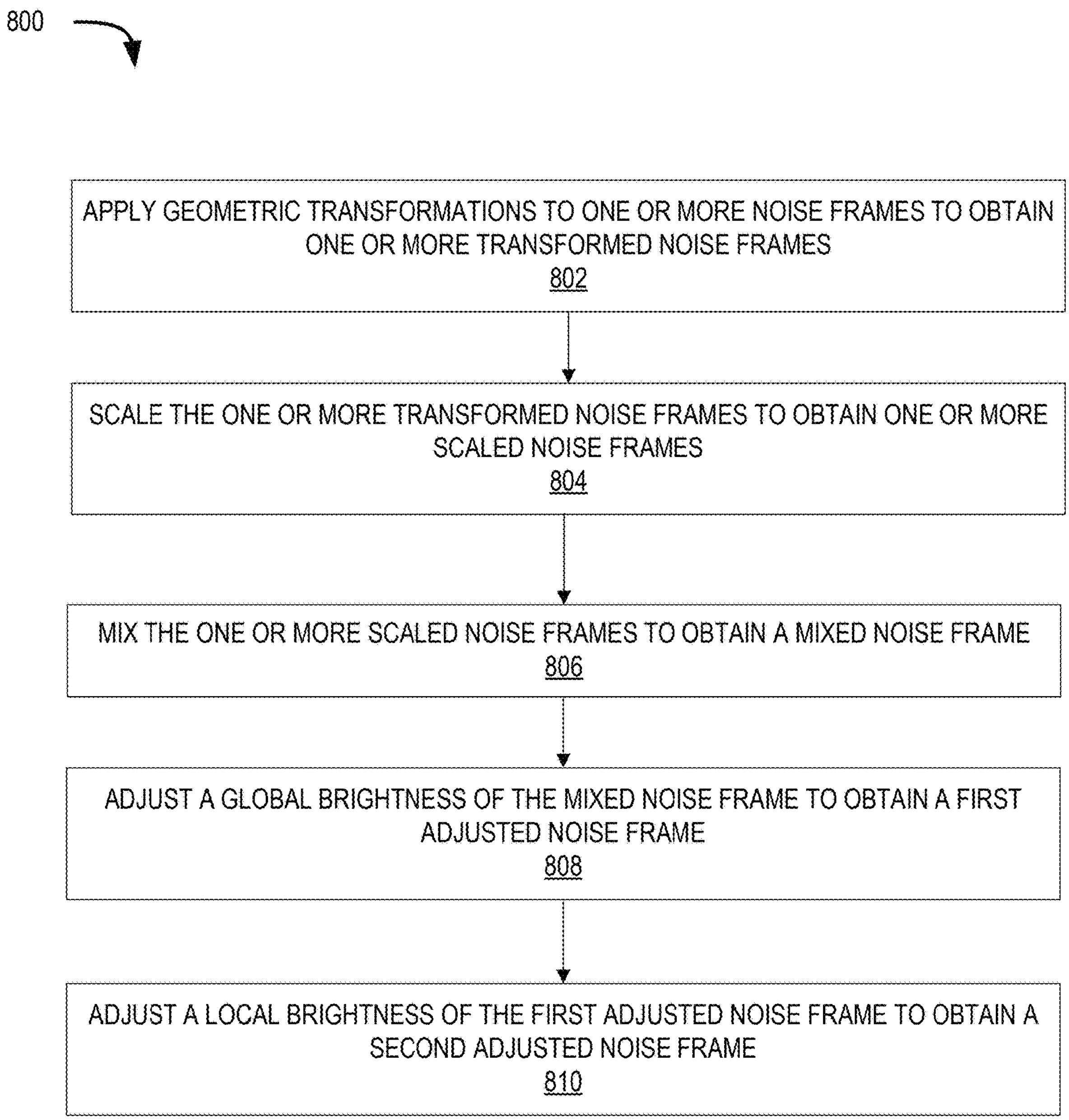
FIG. 8 shows an example method for noise data augmentation.

Example transformations for noise geometry include translation, reflection, rotation, and dilation. For example, the noise data augmentation engine 420 rotates a noise frame by turning the noise frame around a fixed point or flips a noise frame across an axis to transform the noise frame in geometry. In some examples, the noise data augmentation engine 420 scales or resizes the one or more noise frames and mixes the one or more resized noise frames into one mixed noise frame. The noise data augmentation engine 420 can also augment the mixed noise frame with different global brightnesses or local brightnesses. FIG. 8 shows an example method for augmenting the noise data extracted in FIG. 7 in one or more aspects, as will be described in detail below.

At block 608, the communication platform 310 applies the one or more augmented noise frames to a second set of video data with a second noise level below a second threshold value to generate a third set of video data. The paired data generation engine 425 of the training data generation system 430 on the communication platform 310 applies the one or more augmented noise frames to a set of high-quality video data to generate a set of low-quality video data corresponding to the set of high-quality video data. The set of high-quality video data and the set of low-quality video data form pairs of high-quality and noisy images, which collectively define a set of high-low video data for training a denoising model. The set of high-quality video data are captured with one or more high-quality camera with appropriate camera settings (e.g., aperture, shutter speed, and ISO sensitivity) and environmental settings (e.g., sufficient lighting conditions) by professional photographers, so that the noise level is below the second threshold value.

The paired data generation engine 425 adds the one or more augmented noise frames to the video frames of the set of high-quality video data to generate a corresponding set of low-quality video data. In some examples, the noise data augmentation engine 420 can repeat block 606 or the process in FIG. 8 multiple times to generate multiple augmented noise frames to form an augmented noise sequence. The paired data generation engine 425 adds the augmented noise sequence to the set of high-quality video data. In some examples, the augmented noise sequence is added to the set of high-quality video data chunk by chunk. A chunk is a segment of the noise sequence or video data, and each chunk includes multiple frames. The augmented noise sequence can be considered as one chunk or divided into multiple chunks to add to the set of high-quality video data. In some examples, the augmented noise sequence is added to the set of high-quality video data frame by frame. If the total number of chunks or the total number of frames of the noise sequence is less than that of the set of high-quality video data, the augmented noise sequence can be iteratively applied to the set of high-quality video data until the whole set of high-quality video data is processed for generating corresponding low-quality video data.

At block 610, the communication platform 310 generates a pair of video data comprising the second set of video data and the third set of video data. The second set of video data is high-quality video data, and the third set of video data is low-quality video data. The paired data generation engine 425 pairs the low-quality video data and the high-quality video data to form a low-high quality data pair. Blocks 606 and 608 can be repeated to generate multiple sets of low-quality video data to pair with the high-quality video data to generate multiple pairs of video data.

At block 612, the communication platform 310 trains a machine learning model using the pair of video data to denoise video data. The pair of video data is training data for a deep learning denoising model. The low-quality video data in the pair of video data is obtained using real-scene noise extracted noisy images. Moreover, the amount of available paired data is greatly increased through noise data augmentation, thereby reducing the number of noisy images captured for noise data acquisition at block 602. Thus, the deep learning denoising model can be trained to remove noises in real scenes effectively and efficiently.

The example method 600 illustrates a method for generating low-high quality data pairs for training a denoising model. However, not every step in the example method 600 may be needed, or some steps may be in a different order. The example method 600 is performed by a communication platform 310. Alternatively, the example method 600 can be performed by a communication application 435 provided by the communication platform 310 and installed on a client device 340. Alternatively, the example method 600 can be performed by a server that is not limited to the video communication context, but any suitable servers that can generate training data for training a denoising model which can be used for image or video processing.

Referring now to FIG. 7, FIG. 7 shows an example method 700 for extracting noise data from a set of noisy video data. The example method 700 will be discussed with respect to the system 400 shown in FIG. 4; however, any suitable system for extracting noise data from a set of noisy video data may be used.

At block 702, a communication platform 310 denoises the first set of video data at block 602 using a denoising algorithm to obtain a fourth set of video data. The first set of video data has a noise level above the first threshold value, and is considered as a set of noisy video data. The fourth set of video data has a noise level below the second threshold value, and is considered as a set of clean video data. The set of noisy video data can be expressed in Equation (1), where Sis the set of noisy video data, P is the total number of frames in the set of noisy video data, $I_i$ represents the i-th frame in S.

$$S = \{I_i\}_{i=1}^{P} \tag{1}$$

The noise data acquisition engine 415 uses or implements an existing denoising algorithm to denoise the set of noisy video data S temporally and spatially to obtain a set of clean video data Sc. Example denoising algorithms include multi-frame averaging, Kalman filter, VBM4D, BasicVSR++, MambaIR. The set of clean video data is expressed in Equation (2), where $I_{d,i}$ represents the denoised i-th frame.

$$S_c = \{I_{d,i}\}_{i=1}^{P} \tag{2}$$

In some examples, a denoising algorithm denoises the set of noisy video data as a whole. Alternatively, or additionally, the denoising algorithm denoises the set of noisy video data chunk by chunk, or frame by frame.

At block 704, the communication platform 310 selects a flat area in the set of clean video data. Although the set of noisy video data is collected under static conditions, some details in the texture areas of video frames may be lost after denoising. However, preserving texture increases the complexity of the denoising process at block 704. Thus, to avoid contaminating the noise data with image details while also reducing the difficulty of denoising, the noise data acquisition engine 415 selects an area in the video frames that do not have any texture. Such an area is called a flat area. The noise data acquisition engine 415 identifies the largest flat aera in a video frame based on histogram analysis, image filtering, or gradient analysis of the set of noisy video data.

At block 706, the communication platform 310 extracts a noise sequence by comparing the first set of video data and the fourth set of video data in the flat area. The set of noisy video data in the flat area of the first set of video data is expressed in Equation (3), where $I_{f,i}$ is the i-th frame of the first set of video data in the flat area. The set of clean video data in the flat area of the fourth set of video data is expressed in Equation (3), where $I_{f,d,i}$ is the i-th frame of the fourth set of video data in the flat area.

$$S_f = \{I_{f,i}\}_{i=1}^{P} \tag{3}$$

$$S_{f,c} = \{I_{f,d,i}\}_{i=1}^{P} \tag{4}$$

The noise data acquisition engine 415 calculates the pixel difference between the set of noisy video data in the flat area $S_f$ and the set of clean video data in the flat area $S_{f,c}$ frame by frame to obtain multiple noise frames, forming a noise sequence. The noise sequence $S_N$ and the noise frame $N_i$ are expressed in Equations (5) and (6).

$$S_N = \{N_i\}_{i=1}^{P} \quad (5)$$

$$N_i = I_{f,i} - I_{f,d,i} \quad (6)$$

The example method 700 illustrates a method for extracting noise data from a set of noisy video data. However, not every step in the example method 700 may be needed, or some steps may be in a different order. The example method 700 is performed by a communication platform 310. Alternatively, the example method 700 can be performed by a communication application 435 installed on a client device 340.

Referring now to FIG. 8, FIG. 8 shows an example method 800 for noise data augmentation. The example method 800 will be discussed with respect to the system 400 shown in FIG. 4; however, any suitable system for augmenting noise data may be used. The example method 800 illustrates noise data augmentation in different aspects, with each step corresponding to augmentation in one aspect, such as geometry, pattern, global brightness, and local brightness. However, not every step in the example method 800 may be needed, or some steps may be in a different order.

At block 802, a communication platform 310 applies geometric transformations to the one or more noise frames to obtain one or more transformed noise frames. The noise data augmentation engine 420 randomly selects one or more noise frames from the noise sequence Sy obtained at block 706 in FIG. 7. In some examples, the noise data acquisition engine 415 repeats the process in FIG. 7 to provide multiple noise sequences. The noise data augmentation engine 420 randomly selects the one or more noise frames from the multiple noise sequences. The noise data augmentation engine 420 applies geometric transformations, for example rotation or flip, to the one or more randomly selected noise frames. The transformed noise frame is expressed in Equation (7), where $N_i$ represents the i-th noise frame and $N_{gi}$ represents the i-th geometrically transformed noise frame.

$$N_{g_i} = \text{geometric}(N_i) \quad (7)$$

At block 804, the communication platform 310 scales the one or more transformed noise frames to obtain one or more scaled noise frames. Since a noise frame is extracted under a certain resolution, the noise frame can be randomly scaled to adapt to changes in noise patterns at different resolutions. After scaling, a noise frame is expressed in Equation (8), where s is a scaling factor and $N_{r,gi}$ represents the i-th resized and geometrically transformed noise frame.

$$N_{r,gi} = \text{Resize}(N_{gi}, s) \quad (8)$$

At block 806, the communication platform 310 mixes the one or more scaled noise frames to obtain a mixed noise frame. Since noise patterns of different cameras vary, to represent or simulate the noise patterns of different cameras, the noise data augmentation engine 420 mixes different scaled noise frames in random proportions as one mixed noise frame. The mixed noise frame is expressed in Equation (9), where $w_i$ is a fusion weight. The fusion weight is expressed in Equation (10), where $a_1, a_2, \ldots, a_m$ are uniformly distributed random numbers.

$$N_{mix} = w_1 \cdot N_{r,g1} + w_2 \cdot N_{r,g2} +, \ldots, +w_m \cdot N_{r,gm} \quad (9)$$

$$w_i = \frac{a_i}{a_1 + a_2 +, \ldots, +a_m} \quad (10)$$

At block 808, the communication platform 310 adjusts a global brightness of the mixed noise frame to obtain a first adjusted noise frame. Since a noise frame is extracted at a certain brightness in FIG. 7, to represent or simulate noise changes under different brightness levels, the noise data augmentation engine 420 adjust a global brightness of the mixed noise frame at block 806 to obtain a first adjusted noise frame. The first adjusted noise frame is expressed in Equation (11), where gb is a global brightness factor. The maximum brightness value of an image is 255, and the average brightness of a noise frame is L, which is between 0 and 255. The global brightness factor is gb, which is a random number between 0 and 255/L.

$$N'_{mix} = gb \cdot N_{mix} \quad (11)$$

At block 810, the communication platform 310 adjusts a local brightness of the first adjusted noise frame to obtain a second adjusted noise frame. The local brightness of an image changes with the image content. The relationship between noise standard deviation and local brightness of an image is represented by a noise level function. The noise data augmentation engine 420 or another module on the communication platform 310 estimates the noise level function t of the high-quality video data accessed at block 608 using wavelet decomposition or statistical analysis. For example, a high-quality video frame from the set of high-quality video data is divided into blocks. A block is a square section of an image, including a set number of pixels, for example 16 by 16 pixels. For each block, the standard deviation and the mean values of the noise are calculated. A lower envelope (e.g., a curve consisting of pointwise minimum) is fit to the standard deviation values against the mean values. The noise level function is approximated based on the lower envelope. In other words, an estimated noise level at any given point is the minimum standard deviation observed for the corresponding mean value. In some examples, the noise level function T is normalized to represent the relative relationship between the noise level at different brightness. The normalized noise level function is expressed in Equation (12), where I is the local brightness of an image, $\tau_{max}$ is the maximum value of $\tau$, and $\tau_{min}$ is the minimum value of T.

$$T(I) = \frac{\tau - \tau_{min}}{\tau_{max} - \tau_{min}} \quad (12)$$

In addition, the noise data augmentation engine 420 converts a video frame H of the set of high-quality video data into a grayscale image $H_{gray}$. The noise data augmentation engine 420 obtains a noise gain map Gmap related to the local brightness of the set of high-quality video data, as shown in Equation (13).

$$G_{map} = T(H_{gray}) \tag{13}$$

The noise data augmentation engine 420 applies the noise gain map G to the first adjusted noise frame $$N'_{mix}$$

obtained at block 808 to obtain the second adjusted noise frame $$N''_{mix},$$

as shown in Equation (14), where ⊕ denotes pixel-wise multiplication.

$$N''_{mix} = G_{map} \odot N'_{mix} \tag{14}$$

The example method 800 can be repeated multiple times to obtain multiple second adjusted noise frames, which can be added to a set of high-quality video data at block 608 in FIG. 6 to generate a set of low-quality video data. The set of low-quality video data and the set of high-quality video data form a low-high quality data pair. The example method 800 illustrates a method for noise data augmentation. However, not every step in the example method 800 may be needed, or some steps may be in a different order. The example method 800 is performed by a communication platform 310. Alternatively, the example method 800 can be performed by a communication application 435 installed on a client device 340.

Figure 9:
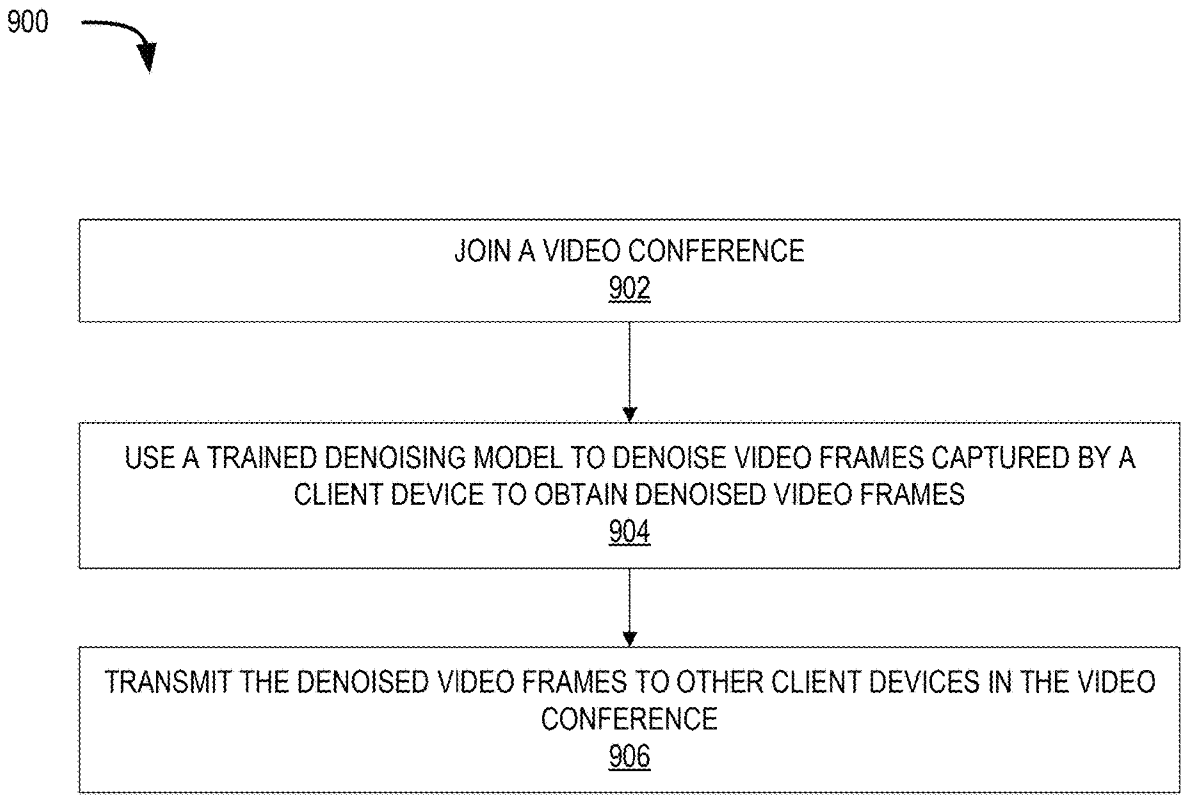
FIG. 9 shows an example method for denoising video frames in a video conference.

Referring now to FIG. 9, FIG. 9 shows an example method 900 for denoising video frames in a video conference. The example method 900 will be discussed with respect to the system 400 shown in FIG. 4; however, any suitable system for denoising may be used.

At block 902, a client device 340 joins a video conference. The video conference server 405 of the communication platform 310 establishes the video conference among the plurality of client devices 340. The client device 340 joins the video conference using a communication application 435. The communication application 435 is provided by the communication platform 310 and includes a video conference module 440. One or more client devices of the plurality of client devices 340 have cameras turned on during the video conference to capture video of the users associated with the one or more client devices.

At block 904, the client device 340 uses a trained denoising model to denoise video frames captured by the client device 340 to obtain denoised video frames. The client device 340 includes a denoising model 410 trained using low-high quality data pairs as shown in FIG. 6. The denoised model 410 is trained on the communication platform 310 and provides to the communication application installed on the client device 340. The trained denoising model 410 denoises video frames of the video captured by the client device 340 to provide denoised video frames. The denoised video frames are of a higher quality than the originally captured video frames.

At block 906, the client device 340 transmits the denoised video frames to other client devices in the video conference. The other client devices 340 in the video conference receives and displays the denoised video frames from the client device 340. Thus, even though the video frames originally captured by the client device 340 is of low quality for various reasons, the client device 340 can still provide high-quality video frames to other client devices.

The example method 900 illustrates a method for denoising video frames in a video conference. However, not every step in the example method 900 may be needed, or other steps may be added. The example method 900 is performed by a client device 340. Alternatively, the example method 900 can be performed by a communication platform 310.

Figure 10:
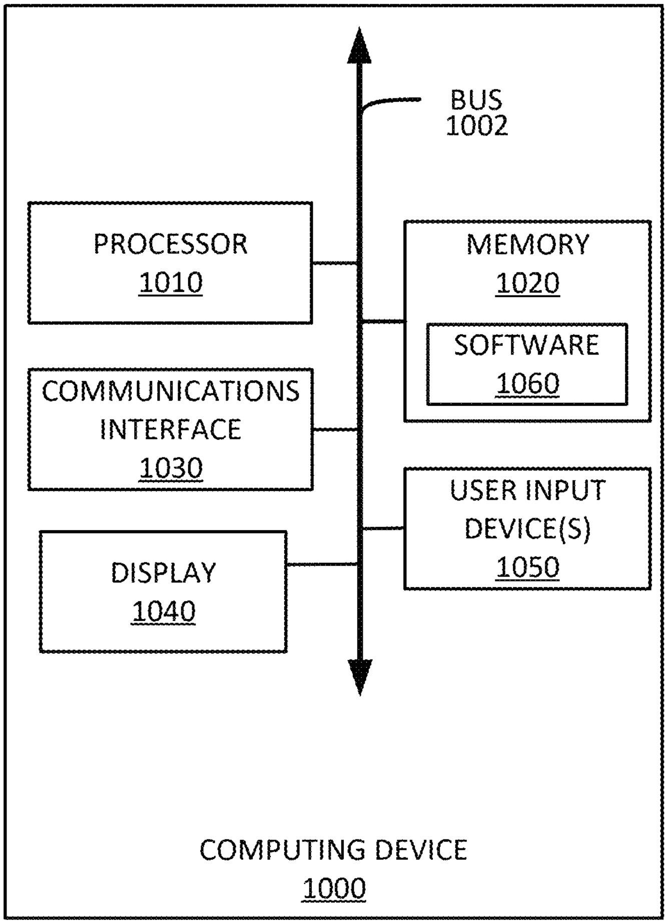
FIG. 10 shows an example computing device suitable for use in example systems or methods for generating denoising training data pairs for training a denoising model and denoising video frames using a trained denoising model according to this disclosure.

Referring now to FIG. 10, FIG. 10 shows an example computing device 1000 suitable for use in example systems or methods for generating training data pairs for training a denoising model and denoising video frames using a trained denoising model according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for generating denoising training data pairs for training a denoising model and using a trained denoising model to denoise video frames according to different examples, such as part or all of the example methods 600, 700, 800, and 900 described above with respect to FIGS. 6-9. In some embodiments, the computing device may include software 1060 for executing one or more methods described herein, such as for example, one or more steps of methods 600, 700, 800, or 900. The computing device 1000, in this example, also includes one or more user input devices 1050, such as a keyboard, mouse, touchscreen, microphone, etc., to accept user input. The computing device 1000 also includes a display 1040 to provide visual output to a user.

In addition, the computing device 1000 includes software 1060 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:

accessing a first set of video data with a first noise level above a first threshold value;

extracting a noise sequence from the first set of video data, the noise sequence comprising a plurality of noise frames;

augmenting one or more noise frames of the noise sequence in one or more aspects to obtain one or more augmented noise frames;

applying the one or more augmented noise frames to a second set of video data with a second noise level below a second threshold value to generate a third set of video data;

generating a pair of training video data comprising the second set of video data and the third set of video data; and training a machine learning model using the pair of training video data to denoise video data.

2. The method of claim 1, further comprising capturing the first set of video data associated with a scene using multiple camera devices under multiple various lighting conditions.

3. The method of claim 1, wherein extracting the noise sequence from the first set of video data comprises:

denoising the first set of video data using a denoising algorithm to obtain a fourth set of video data with a fourth noise level below the second threshold value;

selecting a flat area in a video frame of the fourth set of video data; and extracting the noise sequence by comparing the first set of video data and the fourth set of video data in the flat area.

4. The method of claim 1, further comprises:

randomly selecting the one or more noise frames from the noise sequence; and applying one or more geometric transformations to the one or more noise frames to obtain one or more transformed noise frames.

5. The method of claim 4, wherein the one or more geometric transformations comprise rotation, flipping, and projection.

6. The method of claim 1, wherein the one or more aspects comprise a noise pattern aspect, wherein the noise sequence comprises one or more noise patterns, wherein the method further comprises:

scaling the one or more noise frames to one or more random resolutions to obtain one or more scaled noise frames;

mixing the one or more scaled noise frames to obtain a mixed noise frame of an augmented noise pattern.

7. The method of claim 6, wherein the one or more aspects further comprise a global brightness, wherein the noise sequence is at a first global brightness, wherein the method further comprises:

adjusting the global brightness of the mixed noise frame to obtain a first adjusted noise frame.

8. The method of claim 7, wherein the one or more aspects further comprise a local brightness, wherein the method further comprises:

extracting an image from the second set of video data;

converting the image to a grayscale image;

estimating a relationship between a noise level and a local brightness based on the image to obtain a noise level function;

obtaining a noise gain map based on the grayscale image and the noise level function; and applying the noise gain map to the first adjusted noise frame to obtain a second adjusted noise frame.

9. A system comprising:

a communications interface;

a non-transitory computer-readable medium; and one or more processors communicatively coupled to the communications interface and the non-transitory computer-readable medium, the one or more processors configured to execute processor-executable instructions stored in the non-transitory computer-readable medium to:

access a first set of video data with a first noise level above a first threshold value;

extract a noise sequence from the first set of video data;

augment one or more noise frames of the noise sequence in one or more aspects to obtain one or more augmented noise frames; and apply the one or more augmented noise frames to a second set of video data with a second noise level below a second threshold value to generate a third set of video data;

generate a pair of training video data comprising the second set of video data and the third set of video data; and train a machine learning model using the pair of training video data to denoise video data.

10. The system of claim 9, wherein the one or more processors are configured to execute further processor-executable instructions stored in the non-transitory computer-readable medium to:

capture the first set of video data associated with a scene using multiple camera devices under multiple various lighting conditions.

11. The system of claim 9, wherein the one or more processors are configured to execute further processor-executable instructions stored in the non-transitory computer-readable medium to:

denoise the first set of video data using a denoising algorithm to obtain a fourth set of video data with a fourth noise level below the second threshold value;

select a flat area in a video frame of the fourth set of video data; and extract the noise sequence by comparing the first set of video data and the fourth set of video data in the flat area.

12. The system of claim 9, wherein the one or more processors are configured to execute further processor-executable instructions stored in the non-transitory computer-readable medium to:

randomly select the one or more noise frames from the noise sequence; and apply one or more geometric transformations to the one or more noise frames to obtain one or more transformed noise frames, wherein the one or more geometric transformations comprise rotation, flipping, and projection.

13. The system of claim 9, wherein the one or more processors are configured to execute further processor-executable instructions stored in the non-transitory computer-readable medium to:

scale the one or more noise frames to one or more random resolutions to obtain one or more scaled noise frames; and mix the one or more scaled noise frames to obtain a mixed noise frame of an augmented noise pattern.

14. The system of claim 13, wherein the one or more processors are configured to execute further processor-executable instructions stored in the non-transitory computer-readable medium to:

adjusting a global brightness of the mixed noise frame to obtain a first adjusted noise frame.

15. The system of claim 14, wherein the one or more processors are configured to execute further processor-executable instructions stored in the non-transitory computer-readable medium to:

extract an image from the second set of video data;

convert the image to a grayscale image;

estimate a relationship between a noise level and a local brightness based on the image to obtain a noise level function;

obtain a noise gain map based on the grayscale image and the noise level function; and apply the noise gain map to the first adjusted noise frame to obtain a second adjusted noise frame.

16. A non-transitory computer-readable medium comprising processor-executable instructions configured to cause one or more processors to:

access a first set of video data with a first noise level above a first threshold value;

extract a noise sequence from the first set of video data;

augment one or more noise frames of the noise sequence in one or more aspects to obtain one or more augmented noise frames; and apply the one or more augmented noise frames to a second set of video data with a second noise level below a second threshold value to generate a third set of video data;

generate a pair of training video data comprising the second set of video data and the third set of video data; and train a machine learning model using the pair of training video data to denoise video data.

17. The non-transitory computer-readable medium of claim 16, further comprising processor-executable instructions configured to cause one or more processors to:

capture the first set of video data associated with a scene using multiple camera devices under multiple various lighting conditions;

denoise the first set of video data using a denoising algorithm to obtain a fourth set of video data with a fourth noise level below the second threshold value;

select a flat area in a video frame of the fourth set of video data; and extract the noise sequence by comparing the first set of video data and the fourth set of video data in the flat area.

18. The non-transitory computer-readable medium of claim 16, further comprising processor-executable instructions configured to cause one or more processors to:

randomly select the one or more noise frames from the noise sequence; and apply one or more geometric transformations to the one or more noise frames to obtain one or more transformed noise frames, wherein the one or more geometric transformations comprise rotation, flipping, and projection.

19. The non-transitory computer-readable medium of claim 16, further comprising processor-executable instructions configured to cause one or more processors to:

scale the one or more noise frames to one or more random resolutions to obtain one or more scaled noise frames;

mix the one or more scaled noise frames to obtain a mixed noise frame of an augmented noise pattern; and adjusting a global brightness of the mixed noise frame to obtain a first adjusted noise frame.

20. The non-transitory computer-readable medium of claim 19, further comprising processor-executable instructions configured to cause one or more processors to:

extract an image from the second set of video data;

convert the image to a grayscale image;

estimate a relationship between a noise level and a local brightness based on the image to obtain a noise level function;

obtain a noise gain map based on the grayscale image and the noise level function; and apply the noise gain map to the first adjusted noise frame to obtain a second adjusted noise frame.

* * * * *